United States Patent

Calvert

[19]

[11] Patent Number: 6,007,716

[45] Date of Patent: Dec. 28, 1999

[54] MAGNETIC FILTRATION DEVICE

[75] Inventor: Leonard Calvert, Kelowna, Canada

[73] Assignee: White Lightning Preventative Maintenance Inc., Kelowna, Canada

[21] Appl. No.: 08/663,282

[22] PCT Filed: Oct. 18, 1995

[86] PCT No.: PCT/CA95/00590

§ 371 Date: Jun. 19, 1996

§ 102(e) Date: Jun. 19, 1996

[87] PCT Pub. No.: WO96/12548

PCT Pub. Date: May 2, 1996

[30] Foreign Application Priority Data

Oct. 19, 1994 [CA] Canada .................................. 2118446

[51] Int. Cl.⁶ .................................................. B01D 35/06

[52] U.S. Cl. ......................... 210/223; 210/222; 335/285; 335/303

[58] Field of Search ................................... 210/222, 223; 335/285, 303

[56] References Cited

U.S. PATENT DOCUMENTS

| | | | |
|---|---|---|---|
| 3,480,145 | 11/1969 | Gladden | 210/223 |
| 3,546,643 | 12/1970 | Virostek | 335/303 |
| 4,052,312 | 10/1977 | King | 210/223 |
| 4,498,987 | 2/1985 | Inaba | 210/222 |
| 4,585,553 | 4/1986 | Hikosaka et al. | 210/107 |
| 4,826,059 | 5/1989 | Bosch et al. | 224/183 |
| 4,956,084 | 9/1990 | Stevens | 210/222 |
| 5,078,871 | 1/1992 | McCready | 210/222 |
| 5,282,963 | 2/1994 | Hull et al. | 210/223 |
| 5,314,625 | 5/1994 | Farnelli | 210/695 |
| 5,571,411 | 11/1996 | Butler et al. | 210/223 |

FOREIGN PATENT DOCUMENTS

| | | |
|---|---|---|
| 2061376 | 8/1993 | Canada . |
| 42 36 226 A1 | 4/1994 | Germany . |
| WO 94/11075 | 5/1994 | WIPO . |

OTHER PUBLICATIONS

Off Road Magazine, vol. 27 No. 2, p. 79, ISSN:0363–1745, Feb. 1993, Argus Publishers Corporation.

*Primary Examiner*—David A. Reifsnyder
*Attorney, Agent, or Firm*—Antony C. Edwards

[57] ABSTRACT

A magnet holder accessory for releasable solely magnetic mounting to a metal oil filter cartridge has a magnet housing wherein the magnet housing consists essentially of an upper surface member an opposite lower surface member and side surface members extending around so as to enclose a magnet retaining cavity within the magnet housing, the side surface members contiguous to the perimeter of the lower surface member and the upper surface member, the magnet retaining cavity sized to snugly retain a magnet within the cavity a first distance from a lower surface of the lower surface member and a second distance from an upper surface of the upper surface member, wherein the first distance is a relatively small distance for minimizing attenuation of magnetic force of a magnet within the magnet retaining cavity, and the second distance is a distance significantly larger than the first distance so as to attenuate the magnetic force from the magnet retained within the magnet retaining cavity. The lower surface member us a generally planar thin resilient membrane mounted around its circumference to the side surface members and covering the magnet when within the cavity whereby the magnet holder is adapted to be releasably solely magnetically mounted to an exterior surface of the metal oil cartridge when the magnet is retained within the magnet retaining cavity.

4 Claims, 2 Drawing Sheets

MAGNETIC FILTRATION DEVICE

FIELD OF THE INVENTION

This invention relates to the field of thin-wall spin-on cannister-type oil filters and in particular magnetic attachments for such oil filters such that when installed such attachments act to draw metal particles from the oil in the oil filter and hold such particles against the walls of the oil filter.

BACKGROUND OF THE INVENTION

Applicant is aware of several attempts in the prior art to attach magnets to the exterior of oil filters. In particular, Applicant is aware of U.S. Pat. No. 4,052,312 which issued to King for Strainer Magnets on Oct. 4, 1977, Canadian Patent Application No. 2,061,376 filed Feb. 17, 1992 and laid open Aug. 18, 1993, which application was filed by Perritt for his Magnetic Filter Strap Device, and Applicant is also aware of a device sold under the trade-mark "The Metal Arrester" by Metal Arrester Products of Hurst, Tex., U.S.A.

King teaches a magnetic oil filter strap which is pliable to be wrapped around the circumference of cylindrical oil filters, the ends of the strap resiliently fastened to each other by means of a spring. Perritt similarly discloses a pliable strap for encompassing the circumference of a cylindrical oil filter, the strap acting as a matrix to hold in radially spaced apart relation discrete magnets against the exterior casing of the oil filter. It is taught that the ends of the strap may be releasably fastened using conventional hook-and-loop type fasteners or that the flexible strap is made of resiliently stretchable material and is provided with a non-adjustable joining device at the strap ends whereby the strap may be stretched to fit around the exterior casing of the oil filter. The metal arrester device is a large magnet in a plastic housing that slides onto the end of the oil filter. The metal arrester device is a large magnet in a plastic housing that slides onto the end of an existing oil filter.

The various prior art devices address means for securing magnetic elements to the exterior casing of an oil filter and also to means for securing such magnetic elements for oil filters of various sizes. The problem that has arisen with such prior art devices is that in some instances it is difficult is to fit an annular band, sleeve or the like around the exterior casing of an installed automotive oil filter due to small clearance between the casing of the oil filter and other obstructing structure within the engine compartment. This also occurs when replacement oil filters are used in an automobile and the replacement oil filter diameter is slightly larger than that of the filter being replaced.

Thus it is an object of the present invention to provide individual non-magnetic housings for housing discrete magnetic elements, which housings and magnetic elements do not rely on an annular band, strap or sleeve, or on any band or strap at all in order to be secured to the exterior of a metal oil casing on a piece of machinery such as a metal oil filter casing or transmission, differential, gearbox or like oil bathed machinery enclosed in a metal casing. The individual magnetic element housings of the present invention allow for the distribution of magnetic elements around an oil casing, and in particular the casing of an installed oil filter, without the requirement of forcing a band or strap or annular sleeve into an insufficient clearance space between the oil casing or filter casing and other structures. Thus, the magnetic elements may be placed around, or longtidunally along, the casing or filter wall or even placed on the bottom of casing or filter, to minimize damage to the magnetic element housing and magnetic element when removing or repairing the oil casing or oil filter or when installing a new oil casing or filter.

A further object of the invention is to provide a magnetic element housing which will only minimally attenuate, with respect to metal particles in the oil, the effects of a magnetic element placed against the exterior of an oil filter housing, and which will in respect of an opposed side of such a magnetic element significantly attenuate the effects of the magnetic element acting upon metal hand tools inadvertently brought into close proximity with the magnetic element housing.

SUMMARY OF THE INVENTION

A magnetic element housing is provided for holding a magnet in close proximity with the exterior surface of a metal oil filter casing. The housing serves 2 purposes, namely, allowing the magnet to be adhered to the oil filter casing in close proximity to the casing so as to maximize the magnetic effect of drawing magnetic particles from the oil within the oil filter, and secondly shielding the magnet so as to protect the magnet and provide a sufficient attenuating distance between the magnet and metallic hand tools brought into contact with the exterior surface of the housing. Thus the sides and top of the housing, that is, those portions of the housing not lying between the magnet and the oil filter casing, when the present invention is mounted an the casing, are sufficiently thick so that a metallic hand tool brushed against the exterior surface of the housing will not be held strongly by the magnetic force of the magnet. Thus, the hand tool may be removed from proximity with the housing without dislodging the magnet from the oil filter casing.

In one embodiment of the present invention, the magnet is a super magnet held snugly within a magnet cavity in the housing. On one side of the housing, being that side which would lie between the magnet and the exterior surface of an oil filter casing, is a thin membrane which serves to hold the magnet within the magnet cavity. Apart from the membrane surface, the housing surrounding the magnet cavity is significantly thicker than the membrane and may be formed as a shell-like or dome-like enclosure over the magnet.

It may be that for ease of manufacture, the magnet cavity is accessible via an aperture in the side of the housing.

Advantageously, the housing is made of a resilient material such as silicone-based semi-inorganic polymers used in silicone rubber formulations well known in the art. This would allow for the housing to retain its resilient characteristics within a wide temperature range thus allowing the housing to conformally adhere to the shape of the outer casing of the oil filter and in particular to allow the membrane to deform conformally between a flat surface on the magnet and a corresponding portion of the surface of the oil filter casing whereupon the magnet within the housing is magnetically attached.

Alternatively, the housing, and in particular the membrane, could be of a non-resilient material pre-formed to conformally fit onto the curved outer surface of an oil filter casing and adapted so as to hold a magnet within the cavity by means other than a snug frictional fit, such as clamps or brackets.

Thus a magnet holder oil filter accessory of the present invention comprises a magnet casing having an exterior housing, magnet retaining means mounted to the magnet casing within the exterior housing, the magnet retaining means adapted to retain a magnet within the exterior housing a first distance from a lower surface of the exterior housing, the exterior housing also having an upper surface a second distance from the magnet retaining means, wherein the first distance is a small distance for minimizing attenuation of the magnetic force of a magnet within the magnet retaining means, and the second distance is a distance significantly larger than the first distance so as to attenuate the magnetic force from a magnet retained within the magnetic retaining means.

DETAILED DESCRIPTION OF THE PREFERRED EMBODIMENTS

Figure 1:
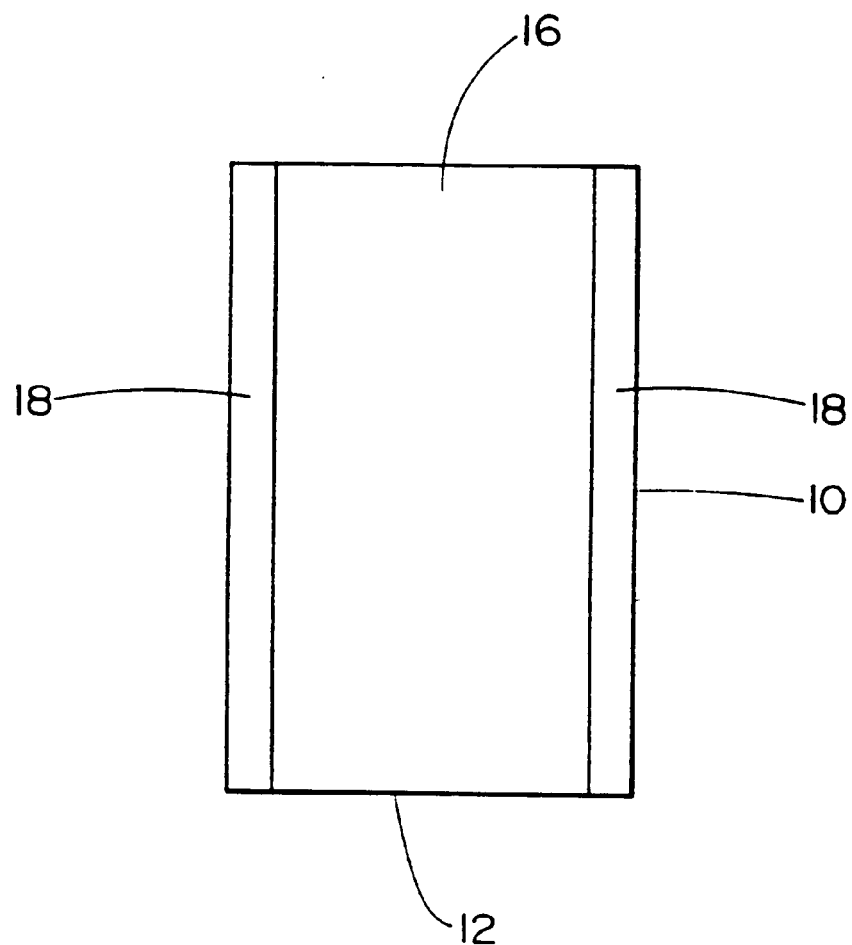
FIG. 1 is, in plan view, the magnetic element housing of the present invention.
Figure 2:
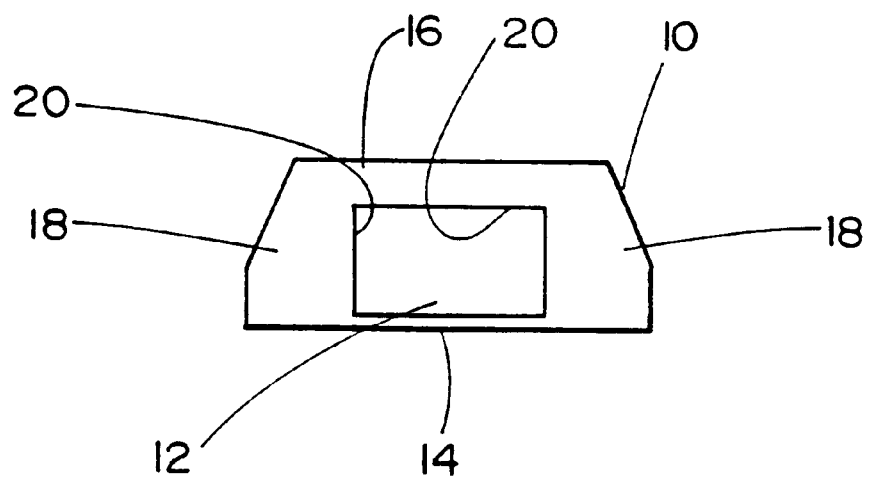
FIG. 2 is, in end elevation view, the magnetic element housing of FIG. 1.

Illustrated in FIGS. 1 and 2 is magnetic element housing 10 as might be manufactured by an extrusion process. Magnetic element housing 10 has magnet cavity 12 for retaining tightly therein a magnet, preferably a so-called "super magnet" such as neodymium 30 or 35 permanent magnets having very strong magnetic abilities. However, of course other super magnetic materials would be suitable.

Magnetic element housing 10 has a thin magnetic element retaining membrane 14 and an opposed thick magnetic element shielding enclosure 16. Enclosure sides 18 contiguously join thin magnetic element retaining membrane 14 and thick magnetic element shielding enclosure 16. The interior surfaces of thin magnetic element retaining membrane 14, thick magnetic element shielding enclosure 16, and sides 18 define walls 20 of magnet cavity 12.

Figure 3:
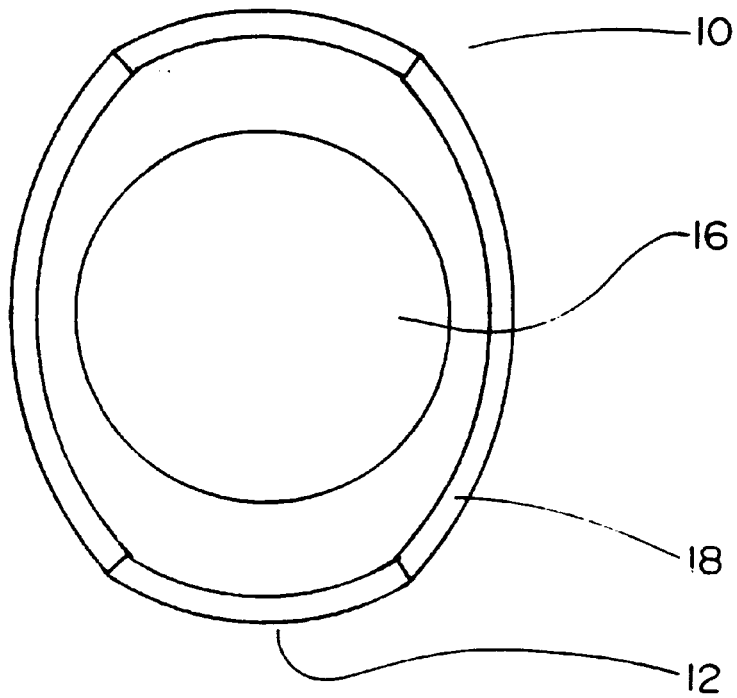
FIG. 3 is, in plan view, an alternative embodiment of the magnetic element housing of the present invention.
Figure 4:
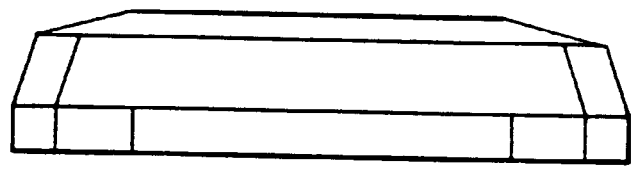
FIG. 4 is, in side elevation view, the magnetic element housing of FIG. 3.
Figure 5:
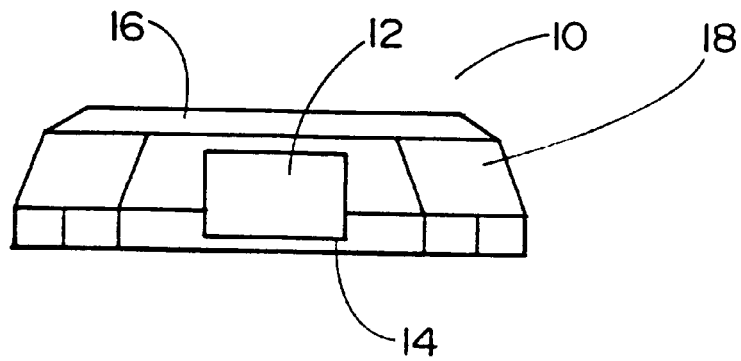
FIG. 5 is, in end elevation view, the magnetic element housing of FIG. 3.

FIGS. 3, 4 and 5 depict an alternative embodiment of magnetic element housing 10 as might be formed by a thermoplastic injection molding process.

In this alternate embodiment, magnetic element housing 10, magnet cavity 12, thin magnetic element retaining membrane 14, thick magnetic element shielding enclosure 16, and sides 18, although cosmetically different, perform the same functions as in the embodiment of the present invention depicted in FIGS. 1 and 2. That is, the object of either embodiment of the present invention is to place a strong magnet into close proximity with the exterior surface of an oil filter canister while, secondly, enclosing the magnet in a shielding enclosure so that the magnet is protected and hand tools which are brought into proximity with the shielding enclosure are held sufficiently apart from the magnet so that the hand tool may be easily moved away from the magnet. Thus although depicted in embodiments in which the ends of a magnet in magnet cavity 12 would be exposed, thus easing manufacture of housing 10, a preferred embodiment would have a magnet in magnet cavity 10 entirely encapsulated.

Examples of the resilient material from which magnetic element housing 10 may be formed are manufactured by General Electric Plastic Division as one example of a supplier of such material. For the extrusion process silicone rubber SE7050 manufactured by General Electric may be used. For the injection molding process, an example of the material which may be used is General Electric G401 Thermo-Plastic. By way of chemical composition, what may be used for the extrusion process is dimethylvinyl polysiloxane polymer (0.2 mold percent vinyl) to which fume process silica, hydroxy end stop silanol, and peroxide curetive have been added. The resultant material when properly cured has heat stability to 600° fahrenheit and a low temperature brittle point of −75° fahrenheit. The rubber extrusion process which may be used is a conventional extrusion process using a 20:1 L/D ratio screw with a compression ratio of 4:1. The material is vulcanized at high temperature as is well known in the art. The extrusion tool itself may be a conventional plate dye with a core and damn assembly used to form magnet cavity 12.

An example of typical dimensions of the extrusion process embodiment might be approximately a 1⅛ inch longitudinal extruded length, a ¾ inch width and a ¼ inch height for magnetic element housing 10, and a 1⅛ inch length, a ⅓ inch width and a ⅕ inch height for magnet cavity 12. Thin magnetic element membrane 14 may be as thin as reasonably possible, for example 1/50 inch (0.020 inches). Of course, firstly, the cavity dimensions will be such that the magnet held in magnet cavity 12 is held snugly. Secondly, the dimensions of the thickness of the shielding enclosure 16, including sides 18, will be sufficient to attenuate the magnetic force of a magnet held in cavity 12.

In a further alternative embodiment, magnetic element housing 10 might merely be a hollow casing or shell with internal supporting structure to rigidly retain therein a magnet in close proximity with an aperture in a open lower surface of the casing or shell. For example, the casing or shell could merely comprise one-half of a clam-shell wherein the magnet is held by a supporting structure closer a lower flat surface of the clam-shell. Thus the clam-shell would be mounted to the exterior surface of an oil filter casing with the flat surface of the clam-shell against the casing.

As will be apparent to those skilled in the art in the light of the foregoing disclosure, many alterations and modifications are possible in the practice of this invention without departing from the spirit or scope thereof. For example, the magnetic element housing of the present invention might be advantageously employed to filter metal particles from oil circulating in oil bathed machinery such as transmissions, differentials, gearboxes and the like either by internal or external mounting to the metal oil casing enclosing such machinery. In such applications, a very strong and possibly larger magnetic element might be required as compared to the application of the present invention to thin-walled oil filter cannisters. Accordingly, the scope of the invention is to be construed in accordance with the substance defined by the following claims.

What is claimed is:

1. A magnet holder accessory for releasable solely magnetic mounting to a metal oil filter cartridge comprising:

a magnet housing, wherein said magnet housing consists essentially of an upper surface member, an opposite lower surface member, and side surface members extending around, so as to enclose, a magnet retaining cavity within said magnet housing, said side surface members contiguous to the perimeter of said lower surface member and said upper surface member, said magnet retaining cavity sized to snugly retain a magnet within said cavity a first distance from a lower surface of said lower surface member, and a second distance from an upper surface of said upper surface member, wherein said first distance is a small distance and said second distance is a distance significantly larger than said first distance, wherein said lower surface member is a generally planar thin resilient thin membrane mounted around its circumference to said side surface members and covering said magnet when within said cavity whereby said magnet holder is adapted to be releasably solely magnetically mounted to an exterior surface of said metal oil filter cartridge when a magnet is retained within said magnet retaining cavity, and wherein said magnet housing is not a means for assisting mounting said magnet to said oil filter cartridge other than by retention of said magnet held within said magnet cavity.

2. The device of claim 1 wherein said first distance is a small distance such that attenuation of magnetic force from a magnet retained within said magnet retaining cavity is minimized in the direction of said metal oil filter cartridge when said magnet housing is releasably magnetically mounted to a surface of said metal oil filter cartridge, and said second distance is a distance significantly larger than said first distance so as to attenuate said magnetic force of said magnet retained within said magnet retaining cavity in a direction through said upper surface member.

3. The device of claim 2 wherein said magnet housing is a shell further comprising an opposed pair of magnet retaining arms for snugly grasping a magnet therebetween.

4. The device of claim 2 wherein said first distance is 0.02 inches.

* * * * *